United States Patent

[11] 3,534,761

| [72] | Inventor | Donald L. Branton<br>Delavan, Wisconsin |
|---|---|---|
| [21] | Appl. No. | 717,269 |
| [22] | Filed | March 29, 1968 |
| [45] | Patented | Oct. 20, 1970 |
| [73] | Assignee | Sta-Rite Industries, Inc.<br>Delavan, Wisconsin<br>a corporation of Wisconsin |

[54] LIQUID TRANSFER APPARATUS
5 Claims, 2 Drawing Figs.

[52] U.S. Cl. .................................................. 137/205,
103/25, 119/14.05, 137/565
[51] Int. Cl. ...................................................... A01j 7/00,
FF04 49/02
[50] Field of Search ........................................... 119/14.5;
222/70; 103/25; 137/205, 565

[56] References Cited
UNITED STATES PATENTS

| 2,190,060 | 2/1940 | Fager | 103/25X |
| 2,791,964 | 5/1957 | Reeve | 119/14.05X |
| 2,935,012 | 5/1960 | Martin | 103/25X |
| 3,019,764 | 2/1962 | Schilling | 119/14.05 |
| 3,224,460 | 12/1965 | Cann | 137/205X |

*Primary Examiner*—Robert G. Nilson
*Attorney*—Andrus, Sceales, Starke & Sawall

ABSTRACT: This invention relates to a milk-transfer apparatus which receives milk from a pipeline and periodically transfers the milk to a bulk storage tank. The apparatus includes a jar having an inlet connected to the pipeline and an outlet connected to the suction side of a pump. A vacuum line is connected to the jar and the vacuum acts through the pipeline to draw milk from the individual milkers and convey the milk to the jar. A variable cycle timer is operably connected to the pump motor and the timing cycle is set in conjunction with the milk flow into the jar so that the pump will operate periodically to pump the milk from the jar to a bulk storage tank.

Patented Oct. 20, 1970

3,534,761

Inventor
Donald L. Branton
By Andrus & Starke
Attorneys

LIQUID TRANSFER APPARATUS

In a pipeline milking system, a pipeline extends around the barn or other milking area and connects the individual milkers to a milk-receiving jar or receptacle. To draw milk from the individual milkers through the pipeline to the jar, a vacuum line is connected to the upper end of the jar, and the milk is periodically pumped from the jar and delivered to a bulk storage tank. In the conventional system, the pumping is controlled by an upper and lower probe located within the jar. When the level of the milk in the jar increases to the level of the upper probe, the pump is operated to deliver milk from the jar to the bulk storage tank, and when the level of milk is receded beneath the level of the lower probe, the pumping is stopped.

The probe system of liquid transfer is also utilized during the washing cycle. After the milking has been completed, it is necessary to completely wash or sanitize all portions of the pipeline system which were contacted by the milk. In the conventional washing system, a third probe is located in the upper end or the neck of the milk-receiving jar, and during the washing cycle, the third probe is connected in the control circuit so that the pump will not be operated until the wash solution rises in the jar to the level of the third probe, thereby permitting a small amount of the wash solution to spill over into the milk trap before the pump is operated to pump the wash solution from the jar.

While the probe system of liquid transfer will accurately control the milk levels in the jar or receptacle, the probe system is relatively expensive and has the added disadvantage that the probes being located in the milk zone, must be thoroughly cleaned after the milking operation. In many cases it is difficult to thoroughly remove the milk from around the probes and from around the seals through which the probes enter the jar.

The present invention is directed to an inexpensive milk-transfer system which will automatically operate to deliver milk from the milk-receiving jar to the bulk storage tank and yet eliminate the electrical probe system normally utilized in a conventional pipeline milking system. According to the invention, the milk-receiving jar has an inlet connected to the pipeline and an outlet connected to the suction side of the pump. A vacuum is drawn through the jar to the pipeline and milk is conveyed from the individual milkers to the jar. A timing unit is operably connected to the pump motor and the proportionate on–off cycling of the timer can be adjusted in conjunction with the rate of milk flow into the jar so that the pump will be actuated when the milk level approaches the upper portion of the jar and the pump will turn off when the milk level recedes to the lower portion of the jar.

The proportionate on-off timing cycle is capable of infinite adjustment so that the dairyman, by visually observing the milk flow into the jar, can set the timer so that the pump will operate to keep the milk from overflowing from the jar.

The milk-transfer system of the invention utilizing the timer to operate the pump is relatively inexpensive compared to the conventional electrical probe system. Not only does the invention eliminate the several probes, but also simplifies the electrical circuitry over that of the conventional system.

The milk-transfer system of the invention can be more readily cleaned in place, for it eliminates the probes which are ordinarily located in the milk zone and must be thoroughly cleaned after each milking operation. In the conventional system, the probes enter the milk-receiving jar through a plug in the upper end of the jar and it is often difficult to thoroughly sanitize the upper ends of the probes as well as the seal through which the probes enter the jar.

By eliminating the probes, the system of the invention eliminates any possibility of a short circuit being established between the upper probe and the stainless steel neck of the milk-receiving jar during the washing cycle.

The time control unit of the invention also includes a "-manual" position in which the pump is continuously operated. During the washing cycle, the control unit is set at the "-manual" position so that the pump will operate continuously to continuously pump the wash solution from the jar.

Other objects and advantages will appear in the course of the following description.

The drawings illustrate the best mode presently contemplated of carrying out the invention.

Figure 1:
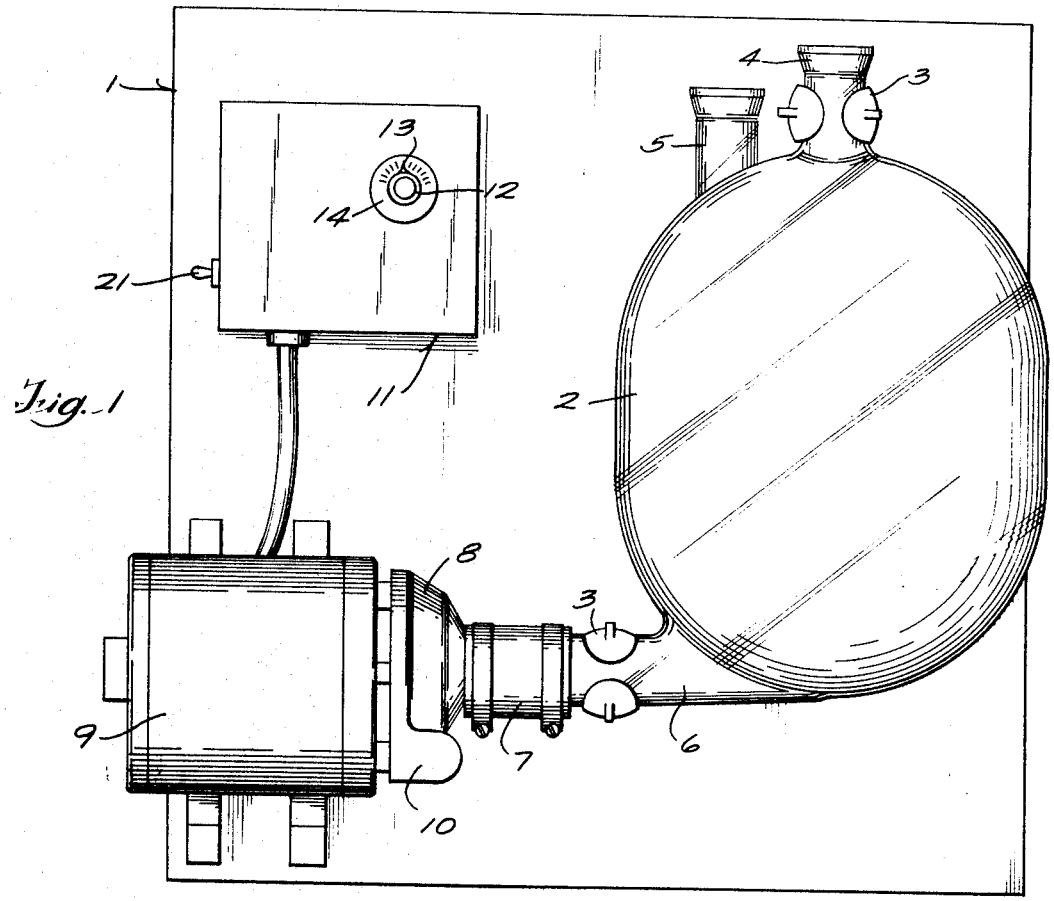
FIG. 1 is a side elevation of the milk-transfer system of the invention.

FIG. 1 illustrates a portion of a pipeline milking system including a wall-mounted panel 1, and a milk-receiving jar 2 is secured to the panel 1 by a pair of clamps 3. The jar 2 has an axial inlet 4 which is adapted to be connected to the ends of a pipeline, not shown, that extends around the barn or other milking area. Individual milkers are connected at spaced locations along the length of the pipeline and milk from the milkers is conveyed through the pipeline and delivered through the inlet 4 to the jar 2.

The jar 2 is also provided with a nipple 5 which is connected to a vacuum pump and with this arrangement a vacuum is drawn through the jar and the pipeline to the individual milkers.

Periodically the milk is withdrawn from the jar 2 through an outlet 6 which is connected by coupling 7 to the suction side of a pump 8 driven by motor 9. The pump 8 and motor 9 are also mounted on the panel 1. The milk is discharged from the pump 8 through an outlet 10 to a bulk storage tank, not shown.

The periodic operation of the pump motor 9 is controlled by a time control unit 11 mounted on the panel 1 and operably connected to motor 9.

During the milking operation the milk will flow to the jar 2 through the inlet 4, and the dairyman, by observing the rate of flow of the milk into the jar, can set the proportionate time that the pump is operating with relation to the nonoperating time. The setting can be achieved by rotating a dial 12 on the unit 11 having a pointer 13 which is read along a calibrated scale 14. For example, assuming that the timer has a total cycle of 60 seconds and it is estimated that the desired time for pump motor operation is 50 percent of the total cycle, the dairyman then moves the pointer 13 to 5 on the scale 14, and the pump motor will then be energized 50 percent of the total cycle time or 30 seconds. By simply moving the pointer the proportionate "on–off" time can be readily varied by the dairyman and adjusted in accordance with the rate of milk flow into the jar 2. Normally, the timer is adjusted so that the "off" period will be sufficient duration to permit the milk level to approach the upper level of the jar before the timer switches to the "on" cycle. Under normal milking practice the setting of the timer 11 is not changed during the milking operation and toward the end of the milking operation, if the milk flow is reduced, the milk level will not rise to its previous level in the jar during the "off" cycle of the pump.

Figure 2:
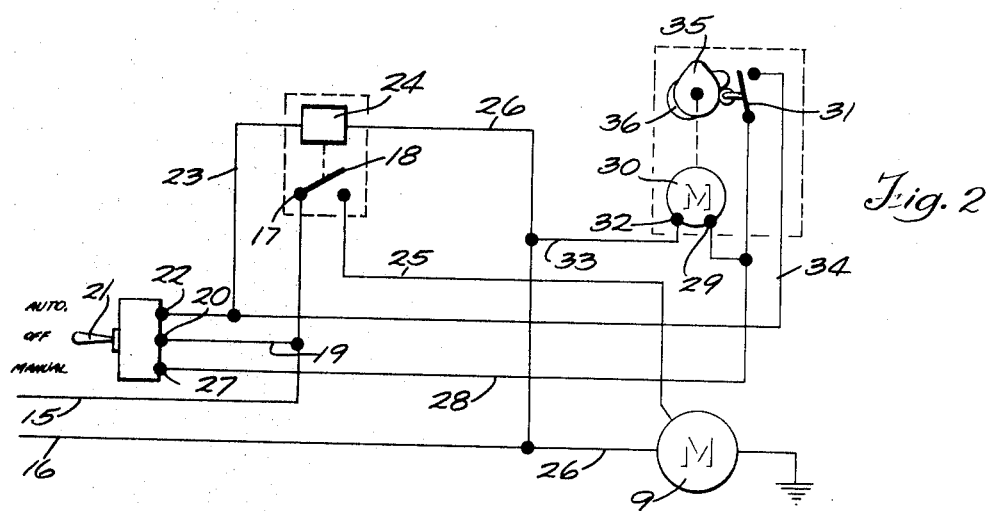
FIG. 2 is a wiring diagram.

FIG. 2 is a wiring diagram for the system and includes a pair of power lines 15 and 16 which are connected to a suitable source of power. Power line 15 is connected to one of the contacts 17 of normally open relay switch 18 and contact 17 is also connected by line 19 to terminal 20 on selector switch 21. As shown in FIG. 2, the selector switch has three positions, "automatic", "off" and "manual". When the switch is in the "off" position the pump motor 8 cannot be energized.

When the switch 21 is moved to the "manual" position, the terminal 20 is connected to the terminal 22 of switch 21, and the terminal 22 is connected by line 23 to relay coil 24 while the opposite end of the relay coil is connected to the power line 16. Thus, moving the switch 21 to the "manual" position will energize the relay coil 24 to close the relay switch 18. Closing of switch 18 will supply power through line 25 to the motor 9. The motor 9 is also connected through line 26 to power line 16 so that when the switch 21 is moved to the "-manual" position the motor 9 will be operated continuously.

When the switch 21 is moved to the "automatic" position the terminal 20 is connected to the terminal 27. Terminal 27 is connected through line 28 to terminal 29 of timer motor 30, and to one of the contacts of switch 31. The terminal 32 of timer motor 30 is connected by line 33 and line 26 to motor 9, while the other contact of switch 31 is connected by line 34 and line 23 to relay coil 24.

The timer motor 30 operates to drive a pair of cams 35 and 36, and a follower 37 connected to switch 31 rides on the periphery of both cams. As the cams rotate the switch 31 is alternately opened and closed, and when the switch is closed the relay coil 24 will be energized to thereby close the relay switch 18 and supply power through line 25 to the motor. The proportionate time that the switch 31 is opened and closed can be varied by rotation of the dial 12 on the control unit 11, which acts to rotate cam 36 relative to cam 35 and thereby changes the overall peripheral configuration of the cams. With this circuitry, when the switch 21 is moved to the "automatic" position the pump motor 9 will be operated periodically when the switch 31 is closed to thereby draw the milk from the jar 2.

The present invention is an inexpensive milk transfer unit which can be readily adjusted by the dairyman to provide the optimum delivery rate for a specific milking procedure. The adjustment can be made daily or monthly, depending on the seasonal milk flow, the number of milking units employed and the speed of milking.

The transfer system of the invention eliminates the electrical probes commonly used in milking systems and, by eliminating the probes, the cost of the system is not only reduced but it also simplifies the cleaning and sanitizing procedure.

I claim:

1. A liquid transfer apparatus, comprising a liquid-receiving container having an inlet to receive liquid and having an outlet to discharge the liquid, said container being free of internal liquid level sensing means, conduit means connecting said container to a source of vacuum, said vacuum acting to draw liquid through said inlet to said container, pumping means connected to the outlet for withdrawing liquid from the container, timing means operably connected to the pumping means for periodically initiating operation of the pumping means for a preset period of time to thereby pump the liquid from the container and adjusting means operably connected to said timing means for selectively changing the proportionate length of time of pumping operation.

2. The apparatus of claim 1, wherein said timing means includes switch means connected in an electrical circuit with said pumping means, and means operably connected to said switch means for periodically opening and closing said switch means to thereby periodically operate the pumping means.

3. A The apparatus of claim 2, wherein said last named means comprises rotatable cam means having a cam surface, and a follower disposed to ride on said cam surface and operably connected to said switch means.

4. A milk transfer apparatus, comprising a milk-receiving jar having an inlet to receive milk and having an outlet in the lower end, said jar being free of internal liquid level sensing means, conduit means connecting said jar to a source of vacuum, said vacuum acting to draw milk through said inlet to said jar, pump means connected to said outlet and disposed to withdraw milk from said jar, timing means operably connected to said pump means for periodically operating said pump means for a first period of time and periodically stopping operation of said pump means for a second period of time, and means for selectively varying said first period of time with respect to said second period of time to thereby vary the period of pumping operation in accordance with the flow of milk into said jar.

5. The apparatus of claim 4, and including manual switch means connected in an electrical circuit with said pump means, said timing means and a source of electrical power, said switch means having a first position and a second position, said switch means when in the first position arranged to connected said pump means directly to said source of power to provide continuous operation of said pump means, said switch means when in said second position arrange to connect said pump means through said timing means to said source of power to thereby provide periodic operation of said pump means.